(12) United States Patent
DaSilva et al.

(10) Patent No.: US 12,234,802 B2
(45) Date of Patent: Feb. 25, 2025

(54) FLOATING OFFSHORE WIND TURBINE ASSEMBLY UNIT

(71) Applicant: Exmar Offshore Company, Houston, TX (US)

(72) Inventors: Otto DaSilva, Houston, TX (US); Dhiraj Purswani, Houston, TX (US)

(73) Assignee: Exmar Offshore Company, Houston, TX (US)

( * ) Notice: Subject to any disclaimer, the term of this patent is extended or adjusted under 35 U.S.C. 154(b) by 496 days.

(21) Appl. No.: 17/657,742

(22) Filed: Apr. 1, 2022

(65) Prior Publication Data

US 2022/0316446 A1    Oct. 6, 2022

Related U.S. Application Data

(60) Provisional application No. 63/169,654, filed on Apr. 1, 2021.

(51) Int. Cl.
| | |
|---|---|
| *F03D 13/10* | (2016.01) |
| *B63B 35/44* | (2006.01) |
| *B63B 73/60* | (2020.01) |
| *B63B 75/00* | (2020.01) |
| *B63B 83/20* | (2020.01) |

(52) U.S. Cl.
CPC .............. *F03D 13/10* (2016.05); *B63B 35/44* (2013.01); *B63B 73/60* (2020.01); *B63B 75/00* (2020.01); *B63B 83/20* (2020.01); *B63B 2035/446* (2013.01)

(58) Field of Classification Search
CPC ......... B63B 35/44; B63B 73/60; B63B 75/00; B63B 83/20; B63B 2035/446; B63B 73/00; B63B 2001/128; B63B 1/12; F03D 13/10; F03D 13/25; F03D 80/50; F03D 2230/6102; F03D 2240/93
USPC ........ 114/256, 259, 264, 265, 266, 267, 268
See application file for complete search history.

(56) References Cited

U.S. PATENT DOCUMENTS

| | | | |
|---|---|---|---|
| 10,661,862 B2 * | 5/2020 | Melis | ..................... B63B 21/502 |
| 11,891,979 B2 * | 2/2024 | Marc | ...................... F03D 13/25 |

FOREIGN PATENT DOCUMENTS

WO    2021212173 A1    10/2021

* cited by examiner

*Primary Examiner* — Daniel V Venne
(74) *Attorney, Agent, or Firm* — Osha Bergman Watanabe & Burton LLP

(57) ABSTRACT

A floating offshore wind turbine assembly unit useful for assembling or maintaining wind turbines at an offshore location is disclosed. The floating offshore wind turbine assembly unit may include a first vessel spaced a distance apart from a second vessel, and an extended deck coupled to the first vessel and the second vessel. The extended deck is positioned in the distance between the first vessel and the second vessel, and the extended deck is configured as a dry dock disposed or movable to a height above a sea level. In some embodiments, the extended deck or a portion thereof is movably coupled to the first vessel and the second vessel. For example, the extended deck or a portion thereof is movable between a submerged or near sea level position and a position above a sea level.

6 Claims, 4 Drawing Sheets

FLOATING OFFSHORE WIND TURBINE ASSEMBLY UNIT

FIELD OF THE DISCLOSURE

Embodiments of the present disclosure generally relate to floating offshore wind turbine (FOWT) assembly units, as well as methods of using such FOWTs to install or perform maintenance on wind turbines offshore.

BACKGROUND

The search for lower unit cost for offshore wind is pushing the industry to larger units and deeper waters. The associated costs and difficulties during installation are forcing a trend to fully integrated solutions from shore facilities. Fully integrated units would then be transported by wet or dry tow to the site for final installation.

The major problem with this trend happens when there are no onshore facilities that can perform this fabrication or integration. This is the current situation with developments on the US West coast as well as any other remote locations that do not have sufficient infrastructure near the selected wind farm site. Similar situations with limited land infrastructure may happen in multiple places that can benefit from the installation of wind renewable energy.

There are additional difficulties associated with the transportation of fully integrated floating wind turbines. The associated accelerations the blades will sustain during this transportation are likely to control the entire design and possibly prevent wet tow from being an option in many instances.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter. By producing sub-assembly components of a floating platform, transportation costs can be significantly reduced. Limited infrastructure may be used for such sub-assemblies that can maximize the local content of local resources In one aspect, the embodiments disclosed herein relate to a floating offshore wind turbine assembly unit, including: a first vessel spaced a distance apart from a second vessel; and an extended deck coupled to the first vessel and the second vessel. The extended deck includes a first deck section and a second deck section. The first deck section is affixed to both the first and second vessels forming a single integrated vessel, and the second deck section is movable between a submerged position and a position above a sea level.

In another aspect, embodiments herein relate to a method of installing a wind turbine using a floating offshore wind turbine assembly unit. The method may include spacing a first vessel a distance apart from a second vessel and joining an extended deck to the first vessel and the second vessel in the distance between the first vessel and the second vessel. Additionally, the joining of the extended deck includes rigidly affixing a first deck section of the extended deck to both the first vessel and the second vessel extending along a length of the vessels intermediate the bow and stern, and movably coupling a second deck section of the extended deck to both the first vessel and the second vessel. A semi-submersible structure of the wind turbine may be lifted onto the second deck section to be dry docked. A tower of the wind turbine may be positioned in a horizontal or near horizontal position proximate the semi-submersible structure disposed on the second deck section. From this horizontal or near horizontal (e.g., laid down) position, the wind turbine may be assembled, including assembling a nacelle to the tower and rotationally coupling a plurality of blades to the nacelle. Following assembly, the method may include raising the tower to a vertical position, wherein in the vertical position, the tower is perpendicular to a deck of the first vessel and the second vessel, forming an assembled wind turbine, and lowering the wind turbine to position the semi-submersible structure in a body of water. Once in the body of water, the assembled wind turbine may be moved to a final location for anchoring, such as by wet towing, with a third vessel, the wind turbine to a position in the body of water.

In yet another aspect, embodiments herein relate to a method of maintaining a wind turbine using the floating offshore wind turbine assembly unit as described herein. The method may include spacing a first vessel a distance apart from a second vessel, rigidly affixing a first deck section of an extended deck to both the first vessel and the second vessel extending along a length of the vessels intermediate the bow and stern, and movably coupling a second deck section of the extended deck to both the first vessel and the second vessel. The vessels and extended deck may be disposed proximate a wind turbine requiring maintenance, and the floating wind turbine may be lifted from the body of water onto the extended deck to be dry docked. The method may then include lowering a tower of the wind turbine to a horizontal or near horizontal position on the extended deck. In the horizontal or near horizontal position, the tower is near and accessible to a deck of the first vessel and the second vessel, allowing ease of access for performing one or more maintenance operations on the wind turbine. Following maintenance, the tower may be raised to a vertical position, wherein in the vertical position, the tower is perpendicular to a deck of the first vessel and the second vessel, forming an assembled wind turbine. The method then includes lowering the wind turbine to position the semi-submersible structure in the body of water and wet towing, with a third vessel, the wind turbine to a position in the body of water.

Other aspects and advantages of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
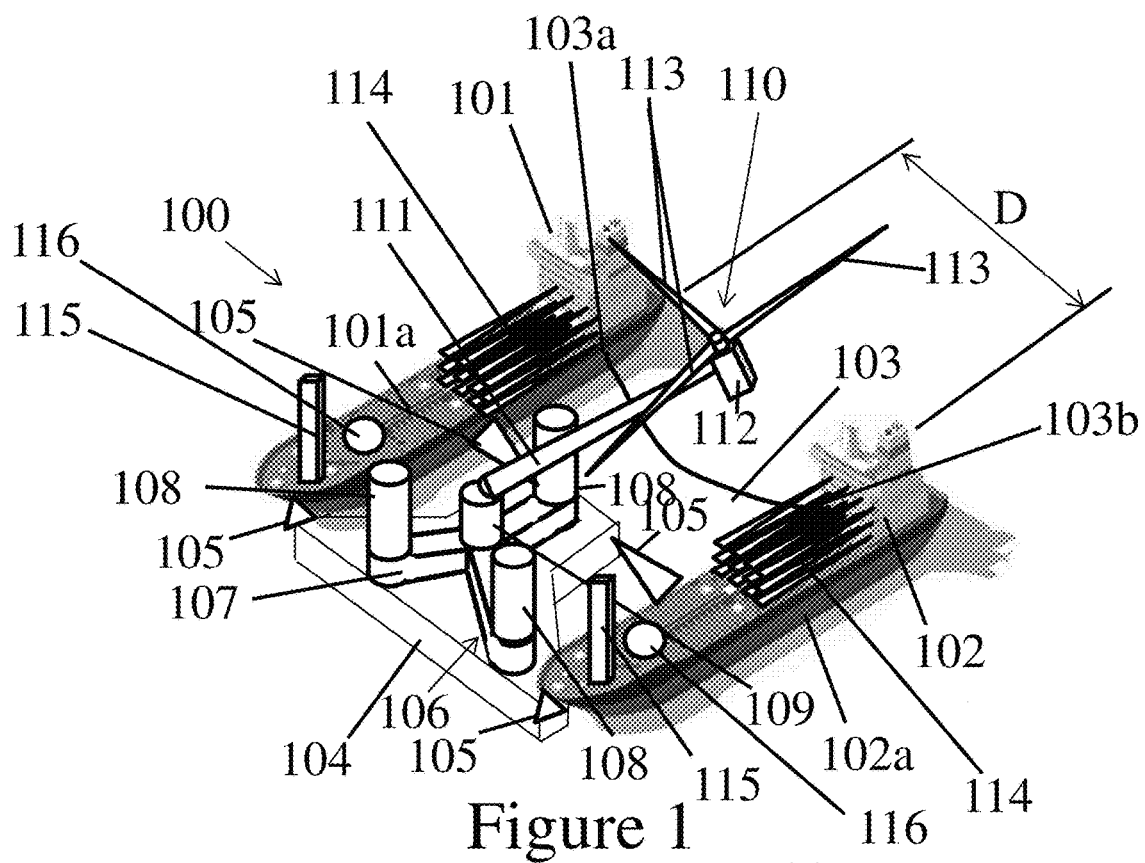
FIGS. 1 and 2 illustrate perspective views of a FOWT assembly unit according to one or more embodiments disclosed herein.

Specific embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description. Wherever possible, like or identical reference numerals are used in the figures to identify common or the same elements. The figures are not necessarily to scale and certain features and certain views of the figures may be shown exaggerated in scale for purposes of clarification.

Furthermore, those having ordinary skill in the art will appreciate that when describing a first element to a second element disposed thereon, it is understood that disposing may be either directly disposing the first element on the second element, or indirectly disposing the first element on the second element. For example, a first element may be directly disposed on a second element, such as by having the first element and the second element in direct contact with each other, or a first element may be indirectly disposed on a second element, such as by having a third element, and/or additional elements, disposed between the first and second elements. As used herein, the term "attached to" or "coupled" or "coupled to" or "connected" or "connected to" may indicate establishing either a direct or indirect connection, and is not limited to either unless expressly referenced as such. Further, embodiments disclosed herein are described with terms designating an offshore vessel in reference to a floating vessel, but any terms designating offshore structure (i.e., any platform or semi-submersible) should not be deemed to limit the scope of the disclosure.

In one aspect, embodiments disclosed herein relate to floating offshore wind turbine (FOWT) assembly units, as well as methods of using such FOWTs to install or perform maintenance on wind turbines offshore. FOWT (Floating Offshore Wind Turbine)-Assembly Units according to embodiments herein can be positioned near any offshore wind farm location and may be used to assemble the hull (structure that supports the wind turbine tower), wind turbine tower, nacelle, and blades without the need for extra-large crane vessels or concerns about high wind during the assembly process.

Embodiments herein provide assembly units that would eliminate all the problems mentioned above without the need for any civil works onshore. Hence, development and deployment of a unit as described herein is a technology that goes completely against the current industry trend of completing and integrating an entire floating offshore turbine unit (hull and turbine) onshore and then conducting an ocean tow. Given the cost of onshore infrastructure development that may not resolve the limiting environmental conditions associated with dry-tow, embodiments herein provide an attractive alternative approach to wind turbine assembly and deployment. Further, by producing sub-assembly components of the floating wind turbine for assembly offshore using FOWT assembly units according to embodiments herein, transportation costs can be significantly reduce, and limited infra structure can be used for such sub-assemblies that can maximize the local content of local resources. Such sub-assemblies may include, for example, large components of the wind turbine, such as the semi-submersible (floater, hull, pontoon) structure, the nacelle tower, the tower, blades, etc., or any other section or sub-section of the wind turbine.

The FOWT Assembly Units according to embodiments herein may include two large oil tankers that are joined together by an extended deck between the two vessels to form a drydock which can be located near the wind farm. In some embodiments, the FOWT Assembly Units may include two retrofitted and modified large oil tankers that are joined together by an extended deck between the two vessels to form a drydock which can be located near the wind farm. Other existing vessels of opportunity may also be retrofitted for use in FOWT assembly units according to embodiments herein, as long as they have sufficient size, area, and stability to accommodate the operations required.

In some embodiments the two ships may be joined together by an extended deck having a first deck section and a second deck section. The first deck section, such as extending along a length of the vessels intermediate the bow and stern, may be rigidly affixed to both the first vessel and the second vessel, resulting in the two vessels forming a single, combined unit having a structural deck that can sustain all wave induced forces. The second deck section may be a vertically movable deck section, and may include elevator-like features that allow the second deck section to traverse from a semi-submerged or near-sea level position to a height similar to that of the first deck section. The semi-submersed or a near sea-level position of the second deck section may allow for easy capture or use of pedestal cranes to move a floating wind turbine or hull from a semi-submersed position onto the deck for elevation and dry-docking. The relative height of the first and second deck sections may be selected to accommodate the height of the pontoons and connection of the semi-submersible structure of the wind turbine, allowing the tower structure to be at or near a height of a top of the semi-submersible lower structure for ease in installation or disassembly.

The FOWT Assembly Unit according to embodiments herein may be used to combine major blocks into a complete hull prior to lowering into the water. The FOWT Assembly Unit according to embodiments herein may be used to capture (dry docking of) the pre integrated hull simply by lifting the platform between the space created between the two vessels. The FOWT Assembly Unit according to embodiments herein may then be used to lower the tower near horizontal to facilitate the assembly with the nacelle and blades. This operation will not require working on very high elevations as it is currently done and substantially reduces dependence on low wind conditions. The FOWT Assembly Unit according to embodiments herein may also be used to grab the fully assembled tower, nacelle, and blades and raise it for integration to the floating wind hull to complete the installation between the tower and hull. After fully assembled, the FOWT Assembly Unit lowers the integrated turbine and hull, releasing the wind turbine for a short wet-tow within the field for final installation.

Conventional methods are based on shipyard construction that is somewhat different than industrial production of large-scale components (for example, automobile industry). In conventional methods, a single design may be built only a couple of times before the design evolves into something different, creating difficulties in developing mass production processes. However, the FOWT Assembly Unit according to embodiments herein may include modifying, retrofitting, and joining two offshore vessel, such as large crude tankers, to form a drydock thereby providing an industrialization and mass production of wind turbine units suitable for installation in deep waters offshore.

Now referring to FIGS. 1-4, a floating offshore wind turbine (FOWT) assembly unit 100 is illustrated. The FOWT Assembly Unit 100 includes at least two offshore vessels (101, 102). The at least two offshore vessels may be a first vessel 101 spaced a distance D apart from a second vessel 102. The first vessel 101 and the second vessel 102 may both be large crude tankers that are retrofitted and modified. In some embodiments, the first vessel 101 and the second vessel 102 may be any combination of any floating offshore vessel (for example, a production vessel, a storage vessel, a drilling vessel, a platform, or a semi-submersible).

In one or more embodiments, the first vessel 101 and the second vessel 102 may be joined together by an extended deck having a first deck section 103 and a second deck section 104 resulting in the two vessels 101, 102 forming a single, combined unit having a structural deck (103, 104) that can sustain all wave induced forces. The first deck section 103 may be rigidly affixed to both the first vessel 101 and the second vessel 102 intermediate the bow and stern. For example, the first deck section 103 extends along a length of a port side of the hull 101a of the first vessel 101 and a starboard side of a hull 101b of the second vessel 102.

The second deck section 104 may be a vertically movable deck section, and may include elevator-like features that allow the second deck section 104 to traverse from a submerged or near-sea level position to a height similar to that of the first deck section 103. For example, at a bow between the two vessels 101, 102, the first vessel 101 and the second vessel 102 may be joined together by the second deck section 104. The second deck section 104 may be attached to a hull 101a of the first vessel 101 and a hull 101b of the second vessel 102 via mechanical fasteners 105. A crane 115, such as a pedestal crane, may be provided on either or both the first vessel 101 and the second vessel 102. The pedestal crane(s) may be positioned on the first and second vessels 101, 102 at a location suitable for, and may be configured to facilitate one or more of installation or movement of the extended deck (103, 104) or a portion thereof, lifting and lowering of a hull or semisubmersible structure of a wind turbine, lifting and lowering of fully assembled wind turbines, and/or rotating a tower of a wind turbine between a vertical position and a horizontal position.

In some embodiments, the second deck section 104 is configured as a dry dock, positioned at a height above a sea level intermediate the first and second vessels. In other embodiments, the second deck section 104, or a portion thereof, is movable between a submerged or near sea-level position and a position above a sea level. In some embodiments, the one or more cranes may be used to lift the second deck section 104 to form a drydock. In some embodiments, the mechanical fasteners 105 may be used to lift the second deck section 104. For example, the mechanical fasteners 105 may be a pulley type connection to allow the second deck section 104 to be vertically moved. Other forms of movable connections, such as screw gears or an elevator, may also be used to raise and lower the second deck section 104. The structure of the elevator/gears and the portion of the second deck section 104 to be raised and lowered should be configured so as to sustain the hull as well as the fully assembled wind turbine.

In one or more embodiments, with the second deck section 104 lifted and drydocked, a semi-submersible structure 106 is disposed on a top surface of the second deck section 104. The semi-submersible structure 106 may include a pontoon base 107 and one or more columns 108 extending upward from the pontoon base 107. Additionally, a center column 109 may positioned in a middle of the pontoon base 107. In some embodiments, for example, one or more of the pedestal cranes 115 may be used to lift a semi-submersible structure 106 onto the extended deck to be dry docked. In other embodiments, the extended deck (103, 104), or a portion thereof, may be submersed, positioned underneath the semi-submersible structure 106, and then the extended deck, or the portion thereof, may be raised to capture and lift the semi-submersible structure 106 to a dry docked position, elevated above a sea level.

Figure 2:
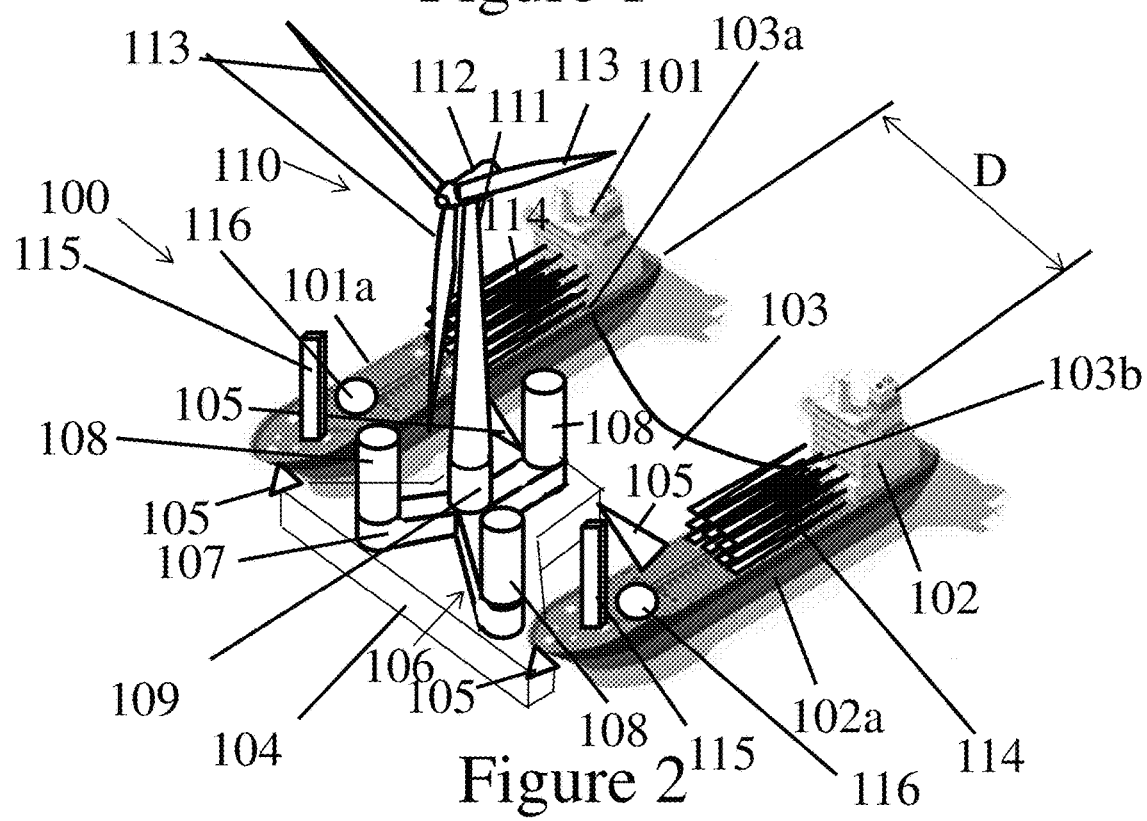

Still referring to FIGS. 1 and 2, in one or more embodiments, components of a wind turbine 110 are disposed on the second deck section 104 proximate the semi-submersible structure 106. The wind turbine 110 may include a tower 111, a nacelle 112, and a plurality of blades 113. In one or more embodiments, a supply vessel or vessels may be used transport one or more of the various components of wind turbine 110 (the semi-submersible structure 106 (hull), the tower 111, the nacelle 112, and the plurality of blades 113) to the FOWT Assembly Unit 100. In other embodiments, some components may be transported along with the first and/or second vessels while other components may be transported by a supply vessel. For example, blades 113, nacelle 112, and/or tower 11 may be transported on the first and second vessels while a supply or tow vessel may be used to transport one or multiple semi-submersible structures to the offshore location or wind farm.

Initially during installation, as shown in FIG. 1, the tower 111 is disposed on the center column 109 at a near horizontal position. In the horizontal position, the nacelle 112 is attached to the tower 111 and the plurality of blades 113 are attached to the nacelle 112.

Once the wind turbine 110 is fully assembled, as shown in FIG. 2, the wind turbine 110 is lifted to a vertical position on the center column 109. It is further envisioned that a rotate or lift handling device 116 may be provided on either or both the two vessels 101, 102 to move the wind turbine 110 from the horizontal position to the vertical position or vice versa. For example, a hydraulic lifting device(s), with capability to locate the tower above the center column or to rotate the tower onto the center column for placement into its final position on the hull for final assembly, may be used. In the vertical position, the wind turbine 110 may be lowered into the water, such as by use of the pedestal crane(s) or the movable deck, and may be wet towed, by the two vessels 101, 102, or by a third vessel (not shown), to a position in a body of water for final installation.

In some embodiments, such as for maintenance operations, a plurality of replacement blades 114 may be provided on the hulls 101a, 102a of each vessel 101, 102. The plurality of replacement blades 114 may be stacked on top of each other to conserve space on the hulls 101a, 102a of each vessel 101, 102. For maintenance operations, the first and second vessels having the extended deck therebetween may be positioned proximate a wind turbine requiring maintenance. The wind turbine may then be lifted from the body of water and dry docked on the second deck section 104. A tower of the wind turbine may then be disconnected from the semi-submersible structure and lowered to a horizontal position. With the tower lowered, one or more maintenance operations may be performed on the wind turbine, such as maintenance on the semi-submersible structure, the tower, the nacelle, and/or the blades. Raising and lowering of the wind turbine for maintenance and re-deployment may be similar to that as described above, such as by use of the pedestal cranes or a submersible deck. Similar steps may also be used for disassembly of the turbines during end-of-life operations.

Figure 3:
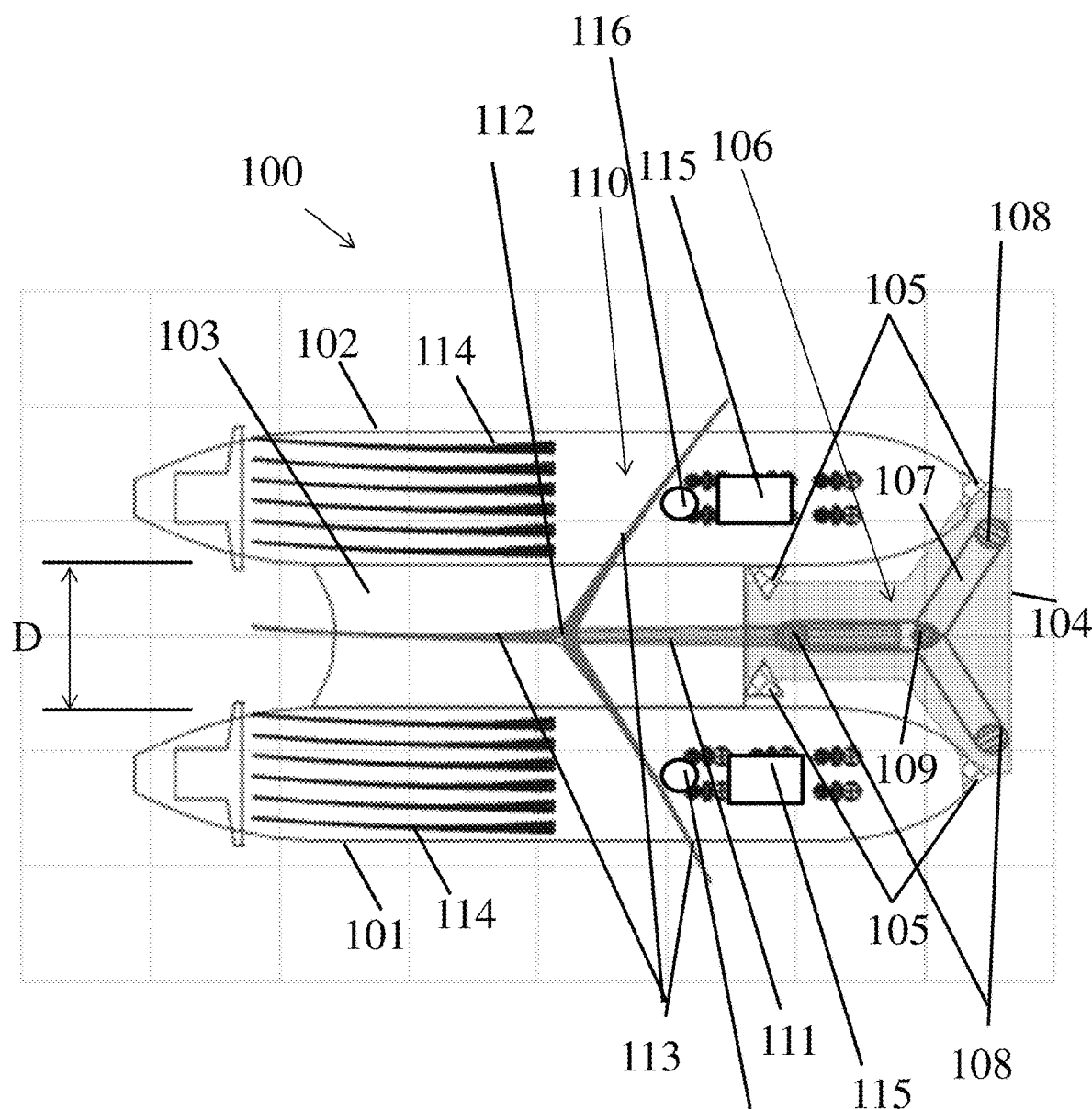
FIG. 3 illustrates a top view of a FOWT assembly unit according to one or more embodiments disclosed herein.

Referring now to FIG. 3, a top view of the FOWT Assembly Unit 100 with the wind turbine 110 in the horizontal position is illustrated. The second deck section 104 may have four connections points on the hulls 101a, 102a. For example, two connections point may be at the bows of each vessel 101a, 102a, one connection point may be at the port side of the first vessel 101, and one connection point may be at the starboard side of the second vessel 102. It is further envisioned that the plurality of replacement blades 114 may be placed side-by-side at a beam of the hulls 101a, 102a.

Figure 4:
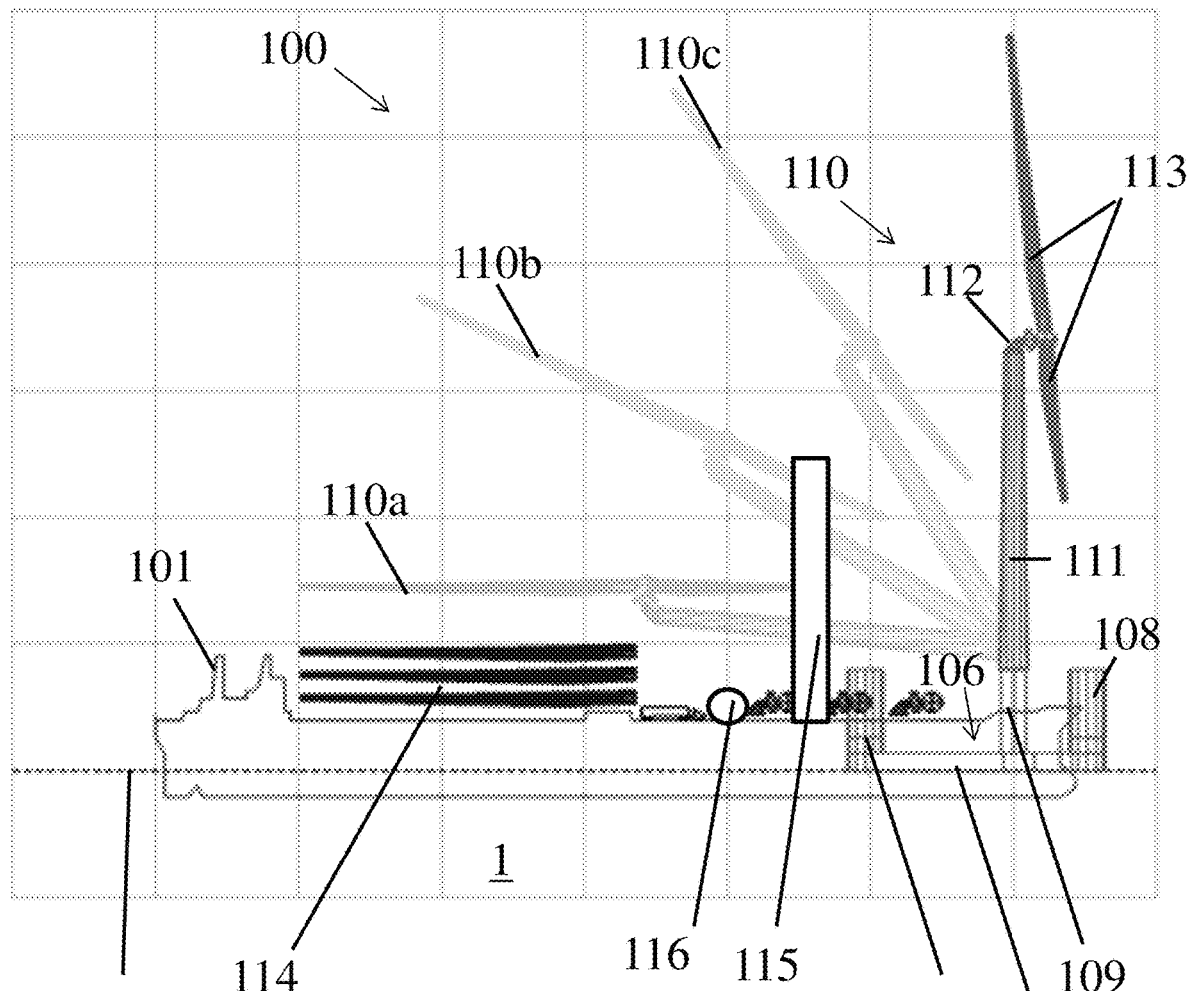
FIG. 4 illustrates a side view of a FOWT assembly unit according to one or more embodiments disclosed herein.

Referring now to FIG. 4, a side view of the FOWT Assembly Unit 100 positioned in a body of water 1 is illustrated. The wind turbine 110 is moved to the vertical position from the horizontal position in increments (110a-110c) such that the wind turbine 110 is perpendicular to the two vessels 101, 102. At the vertical position, the semi-submersible structure 106 may then lowered to be at a surface 2 of the body of water 1.

Figure 5:
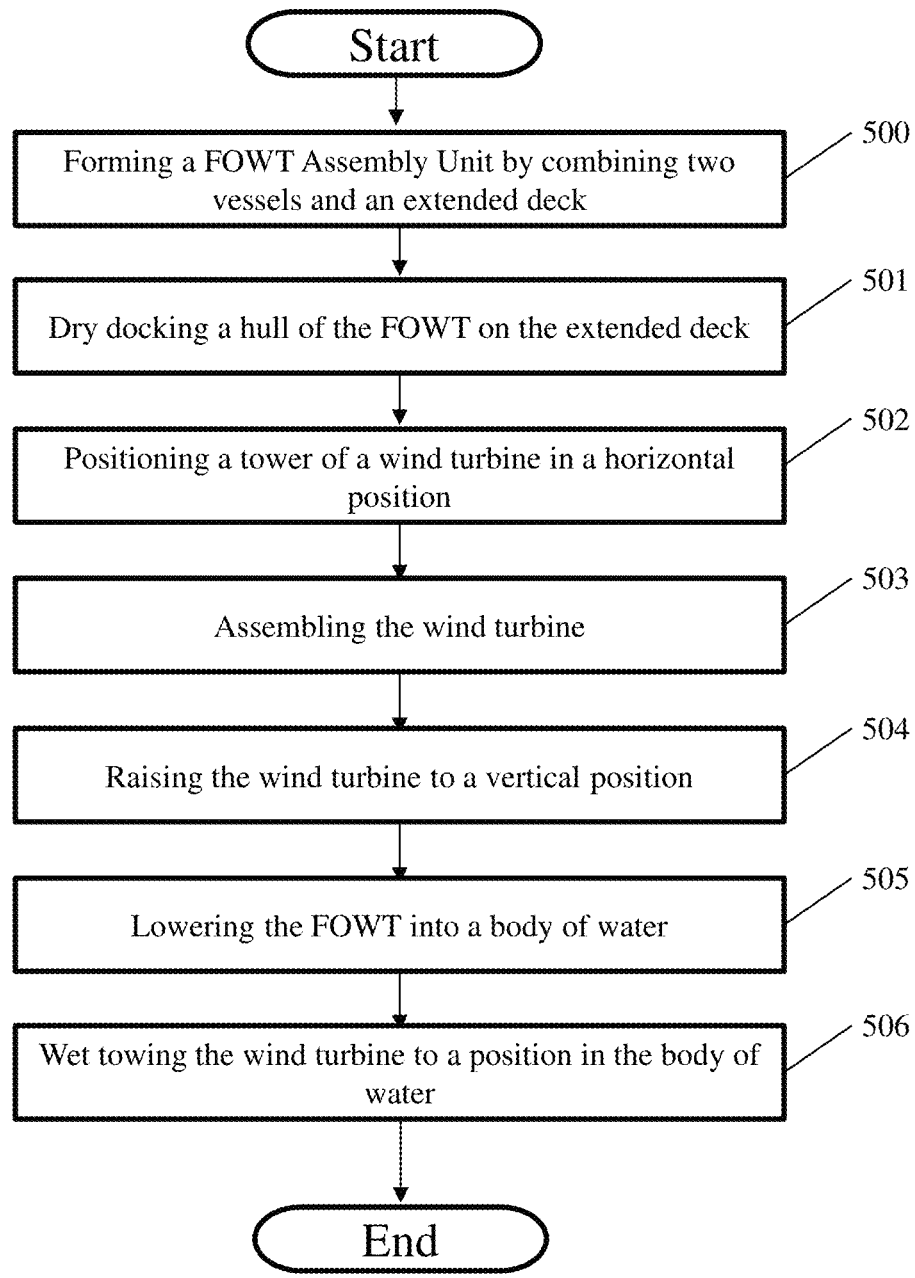
FIG. 5 illustrates a flowchart according to one or more embodiments disclosed herein.

Referring to FIG. 5, a flowchart for using the FOWT Assembly Unit 100 is illustrated. One or more steps in FIG. 5 may be performed by one or more components, such as, a computing system coupled to a controller. For example, a non-transitory computer readable medium may store instructions on a memory coupled to a processor of a computer system such that the instructions include functionality for using the FOWT Assembly Unit 100.

In Step 500, a FOWT Assembly Unit is formed by combining two vessels and an extended deck. For example, the two vessels may be spaced a distance apart from each and be large crude tankers that are retrofitted and modified to be wind turbine assembly vessels. Additionally, the extended deck joins the two vessels together resulting in the two vessels forming a single, combined unit having a structural deck that can sustain all wave induced forces. The extended deck includes a first deck section and a second deck section. The first deck section may be rigidly affixed to both the first vessel and the second vessel extending along a length of the vessels intermediate the bow and stern. For example, the second deck section may have two connections point at the bows of each vessel, a third connection point at the port side of one vessel, and a fourth connection point at the starboard of the other vessel. The second deck section may be a vertically movable deck section, and may include elevator-like features at the connection points that allow the second deck section to traverse from a semi-submerged or near-sea level position to a height similar to that of the first deck section. In addition, a semi-submersible structure is disposed on the second deck section.

In Step 501, a semi-submersible (hull) structure of the FOWT is dry docked on the second deck section. In some embodiments, the hull structure may be lifted onto the second deck section by one or more pedestal cranes located on the first and second vessels. In other embodiments, the hull structure may be positioned above a submerged portion of the second deck section and then lifted. For example, the second deck section may be lifted at the connection points between the two vessels. A crane on either or both vessels may be used to vertically lift the second deck section. Alternately, the connection points may be a pulley connection or a screw gear, to vertically lift the second deck section without needing the crane on either or both vessels. By dry docking, submerged portions the second deck section are brought above a surface of water so that any water on the second deck section is drained and the second deck section is dry for assembly of the wind turbine.

In Step 502, with the semi-submersible structure of the wind turbine dry docked, a tower of a wind turbine is positioned to a horizontal position with respect to the two vessels. For example, the horizontal position is parallel to a deck of the hulls of the two vessels and/or the extended deck. One end of the tower is rotationally coupled to a center column of the semi-submersible structure. It is further envisioned that a supply vessel may transport the various components of the wind turbine to the two vessels.

In Step 503, with the tower in the horizontal position, the wind turbine is assembled. At an end distal to the end of the tower coupled to the center column, a nacelle is attached to the tower. Once the nacelle is attached, a plurality of blades is rotationally coupled to the nacelle.

In Step 504, with the wind turbine assembled, the wind turbine is raised to a vertical position. For example, the wind turbine may be grabbed by a lifting device and the lifting device rotates the tower about the center column from the horizontal position. The wind turbine may be rotated in increments to be perpendicular to the deck of the vessels in the vertical position. In the vertical position, the tower may be locked on the center column to stop rotational movement of the tower.

In step 505, the wind turbine is lowered into the body of water, such as by use of the pedestal cranes and/or the second deck section. For example, the second deck section is lowered to be at a height that allows the semi-submersible structure to submerged in a body of water. For example, a pontoon of the semi-submersible structure provides a buoyancy to keep the wind turbine from sinking in the body of water. Additionally, the center column extends upward from the pontoon such that the wind turbine is above the body of water.

In Step 506, with the FOWT disposed and floating in the body of water, the FOWT may be wet-towed to a position in the body of water and anchored. For example, the two vessels or a third vessel may be operated to tow the wind turbine in the body of water to a predetermined position. For example, tow lines of the third vessel may be attached to the semi-submersible structure to allow the third vessel to wet tow the wind turbine to the predetermined position. The predetermined position may place the wind turbine in a wind farm. Once at the predetermined position, the second deck section may release the semi-submersible structure to have the wind turbine in the wind farm for harnessing wind energy.

As offshore wind developments move into deeper waters, having a lack of specialized, offshore wind assembly/installation vessels would be the biggest potential bottleneck for the nascent U.S. offshore wind industry. Additionally, offshore wind market projections show accelerated growth in the next decade, with cumulative capacity ranging from 154 to 193 GW by 2030, and long-range predictions of over 500 GW by 2050. Conventional methods are not capable of assembly line manufacturing, fail to have a standardization of FOWT assembly and integration across different wind farms, water depth limitation, and sea state restrictions for wet tow. In contrast, the FOWT Assembly Unit according to embodiments herein is capable of assembly line manufacturing, have a standardization of FOWT assembly and integration across different wind farms, does not have a water depth restriction, and is not limited by sea state restrictions for wet tow. The floating wind turbine hull and other portions of the wind turbine may be manufactured as sub-assemblies produced on shore or elsewhere to accelerate the overall process of production and installation of floating wind turbines offshore according to embodiments herein, the integrated vessel structure providing sufficient space and material handling capabilities to move and manipulate the sub-assemblies to complete assembly of the floating hull and the wind turbine offshore proximate the wind farm.

In addition to the benefits described above, embodiments disclosed herein, once deployed, may provide one or more of the following advantages: large efficiency gains in cost and schedule during any floating wind farm installation campaign and will help commercialize more floating offshore wind farms; eliminating the need for ultra large and long floating cranes in the installation unit; eliminate the need for ever increasing cranes or difficulties and worker safety risks created from working 150 m above sea level; eliminate the need for a high-risk wet tow operation of complete floating wind unit associated with unit accelerations and blade integrity on long ocean tows to the wind farm from onshore assembly sites; short wet tow operations within the wind farm for movement of completed floating wind turbines from the FOWT Assembly unit to the location of each turbine; moveable unit takes fabrication to any site eliminating the high cost and schedule needed to create assembly and integration at every location to supply projects. (e.g. redeployment between West Coast, Hawaii and Alaska is possible); standardization of assembly and integration is possible unlike onshore facilities which is always site specific and constrained by local considerations which force customized infrastructure approaches resulting in cost and schedule uncertainty; repeatability of design which achieves significant cost and schedule efficiencies as the unit will be designed to accommodate any offshore development and it will be able to sail between locations; Incorporate an assembly line manufacturing approach to completion of floating wind turbine on site; enable use of multiple fabrication sites for major block fabrication (closest to site), which can be brought to site thereby moving the industry towards a more assembly line manufacturing approach; and assist the maintenance and decommissioning of floating turbine unit.

Unless defined otherwise, all technical and scientific terms used have the same meaning as commonly understood by one of ordinary skill in the art to which these systems, apparatuses, methods, processes and compositions belong. The singular forms "a," "an," and "the" include plural referents, unless the context clearly dictates otherwise. As used here and in the appended claims, the words "comprise," "has," and "include" and all grammatical variations thereof are each intended to have an open, non-limiting meaning that does not exclude additional elements or steps. "Optionally" means that the subsequently described event or circumstances may or may not occur. The description includes instances where the event or circumstance occurs and instances where it does not occur. When the word "approximately" or "about" are used, this term may mean that there can be a variance in value of up to ±10%, of up to 5%, of up to 2%, of up to 1%, of up to 0.5%, of up to 0.1%, or up to 0.01%. Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A floating offshore wind turbine assembly unit, comprising:
   a first vessel spaced a distance apart from a second vessel;
   an extended deck coupled to the first vessel and the second vessel, wherein the extended deck is positioned in the distance between the first vessel and the second vessel;
   wherein the extended deck comprises a first deck section and a second deck section, the first deck section affixed to both the first and second vessels forming a single integrated vessel, and the second deck section being movable between a submerged or near sea level position and a position above a sea level.

2. The floating offshore wind turbine assembly unit of claim 1, wherein the first vessel and the second vessel are retrofitted oil tankers.

3. The floating offshore wind turbine assembly unit of claim 1, further comprising a crane disposed on each of the first vessel and the second vessel, wherein the cranes are configured to facilitate movement of a hull of a floating offshore wind turbine onto the second deck section.

4. The floating offshore wind turbine assembly unit of claim 1, wherein the second deck section has two connections point, at bows of the first vessel and the second vessel, a third connection point at a port side of the first vessel, and a fourth connection point at a starboard side of the second vessel.

5. The floating offshore wind turbine assembly unit of claim 1, wherein the second deck section is configured to receive a semi-submersible structure.

6. The floating offshore wind turbine assembly unit of claim 1, further comprising a lifting device configured to raise a tower of the wind turbine.

* * * * *